(No Model.)

I. BARKER.
PIT CAR.

No. 307,900. Patented Nov. 11, 1884.

Witnesses:
J. D. Clark
C. C. Clark

Inventor
Irving Barker
per Wm. Zimmerman
Attorney

UNITED STATES PATENT OFFICE.

IRVING BARKER, OF BRAIDWOOD, ILLINOIS.

PIT-CAR.

SPECIFICATION forming part of Letters Patent No. 307,900, dated November 11, 1884.

Application filed March 15, 1884. (No model.)

*To all whom it may concern:*

Be it known that I, IRVING BARKER, a citizen of the United States, residing at Braidwood, in the county of Will and State of Illinois, have invented certain new and useful Improvements in Pit-Cars, which are fully set forth in the following specification, reference being had to the accompanying drawings, forming a part hereof, and in which—

Figure 1:
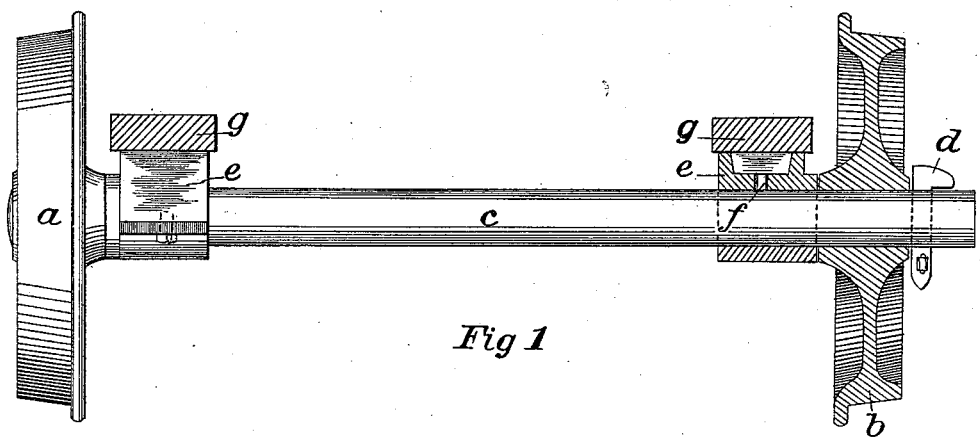
Figure 2:
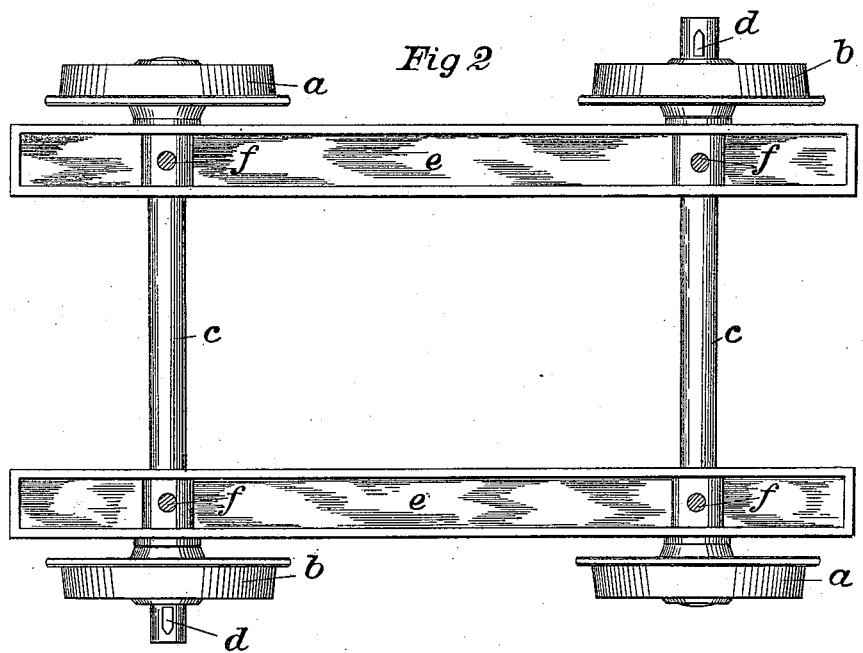

Figure 1 shows a pair of wheels and an axle in elevation, of which one wheel and the axle-box are cut by a vertical plane parallel to the axle of the wheels. Fig. 2 is a plan view of the wheels and boxes or troughs $e$ connecting the front and rear axles of the car.

Like letters of reference indicate like parts.

The object of my invention is to improve the construction of the pit-car patented to me October 10, 1882, and numbered 265,561.

$a$ and $b$ are the wheels attached to axles $c$. Said axles play in boxes cast integral with the troughs $e$, and are oiled through a hole, $f$, on top of the box into which the oil runs when the car is tipped, as in my former patent.

$g$ are the sills of the box placed upon and extending the entire length and beyond the ends of the troughs or oil-boxes, and said sills are firmly secured on said boxes and form tight covers thereto. In this construction one pair of axles is dispensed with and one of the wheels, $a$, is firmly secured to its axle, and the other wheel, $b$, is bored large enough so that its hub shall turn freely on its axle, and is secured by a linchpin, $d$, keyed to its place. The entire axle from the hub of the wheel $a$ to its end is of uniform diameter. Each side of the car, as shown, has a wheel fixed to and one revolving loosely on its axle, or, in other words, the fixed wheels $a$ and loose wheels $b$ are placed diagonally opposite each other on the front and rear axles respectively.

In a car constructed as here shown only two instead of four axles are required to attain the same end sought in my former patent—namely, to enable the car to turn short curves without any perceptible increase of friction—and, further, the wearing parts are all oiled by the same contrivance for oiling. As the hub of the loose wheel joins the axle-box, it receives its oil from it freely. As the wheels are all of the same diameter, the loose wheels will not turn on, but with, the axles when running on straight tracks and will only turn so much in the hubs as may be required to compensate for the difference of travel required for the inside and outside tracks of the curve when running on them. As no increased or binding friction can occur in the running-gear of a car constructed as here shown, the axles or their boxes or hubs will never wear out of round.

What I claim is—

1. The combination, with oil-troughs $e$, extending from front to rear axles and provided with a series of two or more axle-boxes having oil-holes $f$, of the axles provided with one fixed and one loose wheel each respectively and means for automatically oiling the same, substantially as specified.

2. The combination, with oil-troughs $e$, extending from front to rear axles and provided with a series of two or more axle-boxes having oil-holes $f$, of the axles provided with one fixed and one loose wheel to each axle, and whereof said fixed and loose wheels alternate in longitudinal and lateral arrangement, and means for automatically oiling the loose wheel, substantially as specified.

IRVING BARKER.

Witnesses:
J. D. BENNETT,
WM. MOONEY.